United States Patent [19]  [11] Patent Number: 5,224,515
Foster et al.  [45] Date of Patent: Jul. 6, 1993

[54] TUBE CLOSURE

[75] Inventors: Kevin D. Foster, Atlanta; Ioakim Haldopoulos, Fairburn, both of Ga.

[73] Assignee: Porex Technologies Corp., Fairburn, Ga.

[21] Appl. No.: 828,125

[22] Filed: Jan. 30, 1992

[51] Int. Cl.⁵ .................................... F16L 57/00
[52] U.S. Cl. .................................. 138/89; 138/96 T; 604/256
[58] Field of Search .............. 138/89, 90, 96 R, 96 T, 138/109; 220/DIG. 19; 604/256, 283; 215/247

[56] References Cited

U.S. PATENT DOCUMENTS

| D. 178,961 | 10/1956 | James . | |
|---|---|---|---|
| D. 225,161 | 11/1972 | Ritchie . | |
| D. 241,919 | 10/1976 | Best et al. . | |
| D. 289,796 | 5/1987 | Larkin . | |
| 1,430,685 | 10/1922 | Sampson | 220/DIG. 19 |
| 1,674,998 | 6/1928 | Spang | 138/96 T |
| 1,825,553 | 9/1931 | Smith | 220/DIG. 19 |
| 2,321,667 | 6/1943 | Foster | 138/96 T |
| 2,551,834 | 5/1951 | Ferguson | 138/96 T |
| 2,580,762 | 1/1952 | Greniere et al. | 138/96 T |
| 2,737,205 | 3/1956 | Strongfield | 138/96 R |
| 2,921,708 | 1/1960 | Marcel . | |
| 3,065,767 | 11/1962 | Topf | 138/96 R |
| 3,104,681 | 9/1963 | Gray . | |
| 3,106,206 | 10/1963 | Barr et al. | 215/247 |
| 3,187,777 | 6/1965 | Ashlock | 138/96 R |
| 3,200,984 | 8/1965 | Fuestein et al. | 138/89 |
| 3,574,312 | 4/1971 | Miller | 138/96 R |
| 3,606,073 | 9/1971 | Burke | 138/96 T |
| 3,607,098 | 9/1971 | Strande | 215/247 |
| 3,610,288 | 10/1971 | Carr | 138/96 R |
| 3,780,773 | 12/1973 | Haugon | 138/96 R |
| 3,807,457 | 4/1974 | Logsdon | 138/89 |
| 3,821,969 | 7/1974 | Sinko | 138/96 R |
| 3,902,477 | 9/1975 | Gerarde . | |
| 4,008,820 | 2/1977 | Ruetz . | |
| 4,033,380 | 7/1977 | Weber | 138/96 T |
| 4,046,168 | 9/1977 | Milne | 138/96 R |
| 4,119,121 | 10/1978 | Smiley | 138/96 T |
| 4,139,023 | 2/1979 | Turley | 138/96 T |
| 4,295,572 | 10/1981 | Percarpio . | |
| 4,542,833 | 9/1985 | DeVaughn . | |
| 4,579,148 | 4/1986 | Sovish et al. | 138/89 |
| 4,991,104 | 2/1991 | Miller | 215/247 |
| 4,991,629 | 2/1991 | Ernesto et al. | 138/96 T |
| 5,044,404 | 9/1991 | Watson | 138/96 T |

FOREIGN PATENT DOCUMENTS

| 89212 | 6/1960 | Denmark | 220/DIG. 19 |
|---|---|---|---|
| 1316575 | 5/1973 | United Kingdom | 215/247 |

Primary Examiner—James E. Bryant, III
Attorney, Agent, or Firm—Lane, Aitken & McCann

[57] ABSTRACT

A tube closure of elastomeric material having specific properties has an open end, a closed end and a side wall defining a tapering outer frustoconical surface. The side wall has a predetermined thickness at its thinnest point, which is determined in connection with the angle of taper of the outer frustoconical surface and the properties of the elastomeric material to provide a seal with high integrity over a range of tube sizes. The closure has a radially extending flange of predetermined thickness by which the closure can be removed from a tube by a pushing force. The closure has an inner surface for sealing against an outer surface of other tubes.

21 Claims, 3 Drawing Sheets

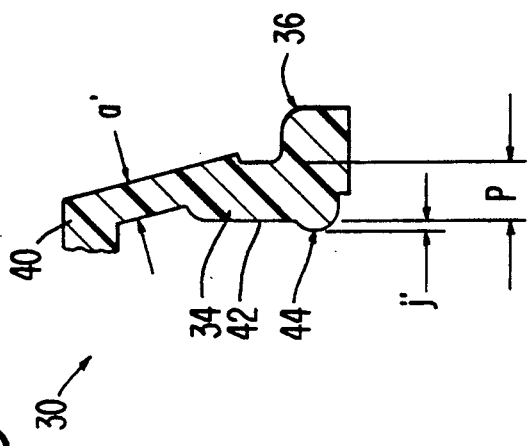
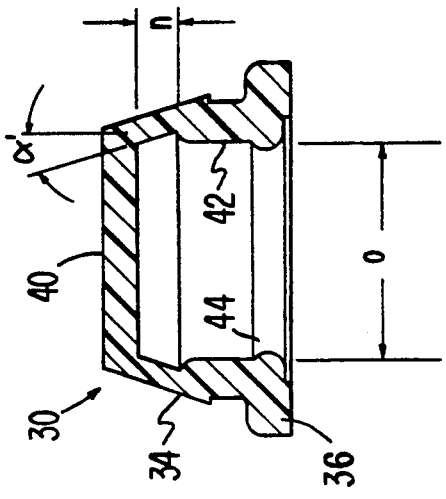
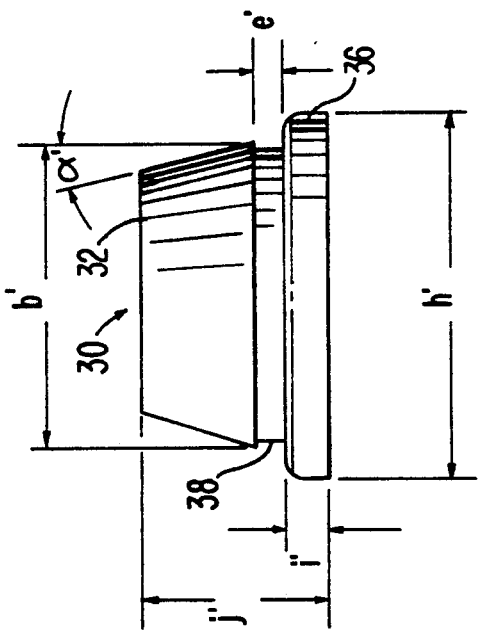

TUBE CLOSURE

The present invention relates to tube closures and, more particularly, to closures of resilient material for evacuated tubes such as blood drawing tubes, test tubes, and instrument tubes/sample cups of glass and plastic.

It is common in the laboratory to have the need to tightly close the open ends of tubes. Although laboratory tubes have a specific nominal diameter, such as 16 mm, 13 mm, etc., the inside and outside diameters for tubes of any given nominal tube size may vary by almost 2 mm. This variation can cause a closure made to fit the largest of the tubes of the nominal size to break smaller tubes of the same nominal size, and a closure made to fit the smallest of the tubes of a nominal size to be too small to fit the largest tubes. Typically, plug-like closures encounter an even worse problem in that a plug made to fit the larger tubes of a nominal size will cause the smaller tubes to break when the plug is inserted.

SUMMARY OF THE INVENTION

The tube closures according to the present invention overcome the problems of prior art closures and positively and equally close tubes throughout a range of diameters for a nominal tube size. The closures will not fall off or cause the tubes to break. The closures are removable by one hand in that they can be pushed off of a tube by the thumb of the hand holding the tube. The closures are easily pierceable by a needle so that liquid in the tube can be withdrawn without removing the closure, and the opening made by the needle is self-closing, so that leakage does not occur when the needle is withdrawn.

In order to provide the above-described operational advantages, each closure according to the present invention has a tapered plug portion for engaging the inner diameter of the tube, the closure being hollow and made of an elastomeric material having a predetermined elasticity, and the plug portion having tapered side walls of a predetermined thickness and taper angle. The thickness of the side walls is controlled so that the tightness of fit with the inner diameter of the tubes is controlled. The closure has an open end and a closed end having a bottom wall defining a septum which is easily penetrable by a needle and which, because of the elastomeric nature of the material, closes any hole made by the needle.

The seal formed by the frustoconical plug portion with the inner diameter of a glass or plastic tube has an integrity which is maintained over a temperature range of 32° F. to 80° F., during high speed centrifuging for thirty minutes, and after the tube is knocked over on a laboratory bench. Despite its ability to maintain the seal integrity, the plug portion is easy to insert in tubes having inner diameters in the range of tube inner diameters for which the closure is designed. The plug portion maintains the seal integrity without the walls of the plug portion collapsing upon insertion in the tube, without glass tubes being cracked or split upon insertion of the plug portion, and with sufficient ease that the typical laboratory technician will be inclined to use the closure.

As a measure of its elasticity, the elastomeric material has a Shore A hardness of 70 to 80 and a side wall thickness at its thinnest point of, for a closure to fit "12 mm" and "13 mm" tubes to 0.039" and, to fit "16 mm" tubes, 0.040" to 0.044". Walls thicker than 0.039" and 0.044", respectively, at their thinnest points for the sizes mentioned above fit too tightly and the closures are too difficult to remove with one hand. In addition, walls having thicknesses at their thinnest points greater than 0.039" and 0.042" cause tube breakage problems for smaller diameter glass tubes within the range of a nominal tube size. Wall thicknesses less than 0.035" and 0.040" for the 12/13 mm model and 16 mm model, respectively, result in side walls which are too weak and, as a result, bulge out and collapse when the closures are inserted into the smaller diameter tubes.

At its open end, the closure includes an outwardly directed flange which engages the top surface of the tube, in a first orientation of the closure. When the closure is inverted relative to the first orientation, it receives a smaller tube in its open end, with an internal surface of the closure sealing against an external surface of the smaller tube. The flange has an outer diameter small enough to permit tubes closed by the closures to be stored side-by-side in a standard test tube rack.

The outwardly extending flange or rim has a thickness between 0.067" and 0.073" for the 12/13 mm size and between 0.075" and 0.080" for the 16 mm size. The flange extends radially beyond the tubes it seals, whether in the first orientation or the inverted orientation, but is especially important in the first orientation. It is the flange or rim which is engaged by the thumb as the closure is removed with one hand. Rim thicknesses below 0.075" and 0.080", respectively, for the two aforementioned closure sizes simply fold over on themselves when pushed by a thumb and do not transmit the thumb forces to the plug portion, and so the plug portion does not move out of the tube.

The angle of taper of the frustoconical plug portion provides sufficient lead-in and ease of insertion, while providing suitable seal integrity. It has been found that a taper angle of 15° on a closure for "12 mm" and "13 mm" tubes and on a closure for "16 mm" tubes satisfies the design requirements. Taper angles less than 15° for the closures provide insufficient lead-in and are too difficult to insert into the smaller size tubes in the nominal range. Taper angles greater than 15° too greatly reduce the amount of the plug portion in contact with the inner surface of larger tubes for the nominal sizes and thereby cause inadequate seal integrity.

BRIEF DESCRIPTION OF THE DRAWINGS

FIG. 7 is a front elevation of an alternate embodiment of the tube closure according to the present invention;

FIG. 8 is a cross-section of the tube closure of FIG. 7; and

FIG. 9 is an enlarged cross-section of a fragment of the tube closure of FIG. 8.

DETAILED DESCRIPTION OF THE PREFERRED EMBODIMENTS

Figure 1:
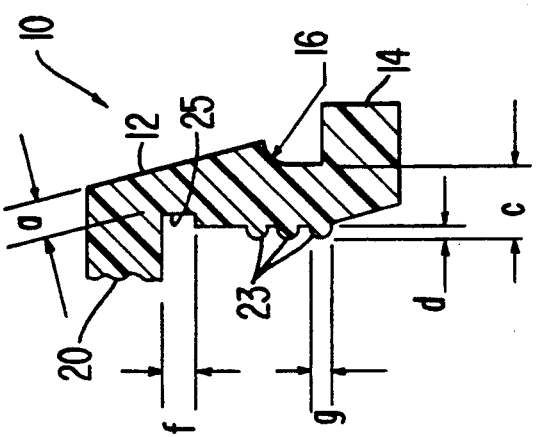
FIG. 1 is front elevation of the tube closure according to the present invention.

As can be seen from FIG. 1, the tube closure according to the present invention, which is designated generally by the reference numeral 10, is generally cylindrical in overall shape and has a plug portion 12 connected to a radially projecting flange or rim 14 by an intermediate portion 16. The plug portion 12 is frustoconical, having an outer surface which tapers from the juncture of the plug portion 12 with the intermediate portion 16, where the plug portion extends radially slightly beyond the intermediate portion 16, to a closed end of the closure.

Figure 2:
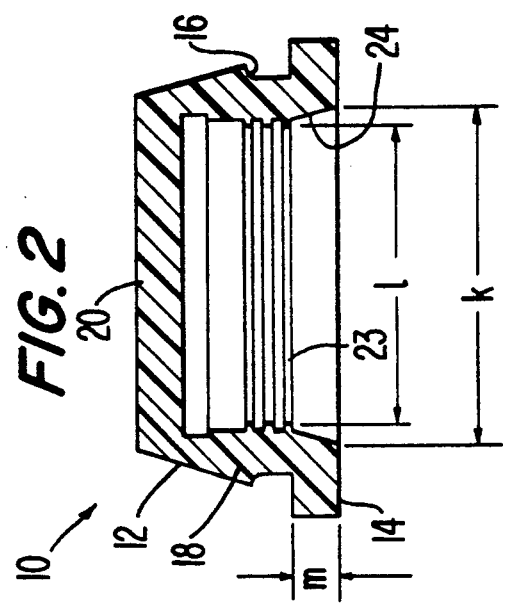
FIG. 2 is a cross-section of the tube closure of FIG. 1.

As can be seen from FIG. 2, the closure 10 is hollow and has a side wall 18 of predetermined thickness. The entire closure 10 is made of an elastomeric material of a specific elasticity, and an end wall 20 of a predetermined thickness extends across the closed end to define a septum. The septum is easily penetrated by a needle and, due to the properties of elastomeric material, any opening made through the septum by the needle automatically closes and seals itself upon withdrawal of the needle.

The elastomeric material of the closure 10 has a Shore A hardness of 70 to 80, and the thickness 'a' of the side wall 18 at its thinnest point (FIG. 3) is from 0.040" to 0.044" for a frustoconical plug portion 12 having a maximum outer diameter 'b' (FIG. 1) of 0.600"–0.604". The thinnest point is at the junction of the side wall 18 with the end wall 20 across the closed end of the closure 10.

A suitable elastomeric material is a thermoplastic olefin elastomer which is manufactured by the Teknor Apex Company under the tradename TELCAR. In addition to having a Shore A hardness of 70 to 80, the TELCAR elastomer has a tensile strength of 1,000–1,300 psi and an elongation to break of 650%–750%. Together, these properties define the elasticity and "memory" of the material. Materials having less elasticity and memory are less "forgiving" and far more difficult to fit to the range of actual tube sizes for which the closure of the present invention can be used.

The angle 'α' of taper of the frustoconical outer surface of the plug portion 12 for the closure 10 is 15° from the axis of symmetry of the closure. Taper angles less than 15° provide insufficient lead-in and are too difficult to insert into the smaller size tubes within the range of tube sizes for a nominal size. Taper angles greater than 15° too greatly reduce the amount of contact of the frustoconical plug portion 12 with the inner surface of the larger tubes for the nominal size and thereby cause inadequate seal integrity.

Figure 5:
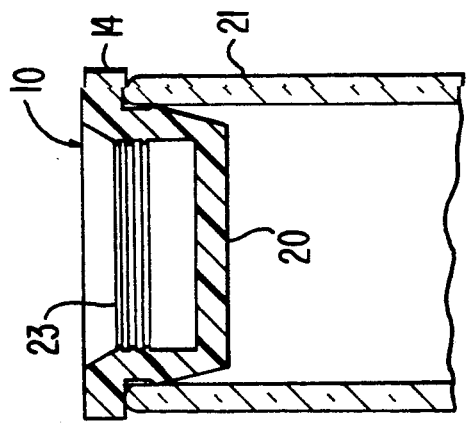
FIG. 5 is a cross-section of the tube closure of FIG. 1 in a position sealing the open end of a tube.

Such a closure is well suited to close the range of actual tube sizes covered by a nominal "16 mm" tube. Tubes produced as "16 mm" tubes actually have inner diameters which vary from 0.500" to 0.574". The frustoconical plug portion 12 forms a seal with an inner surface of the "16 mm" tubes, such as the tube 21, as can be seen in FIG. 5.

Figure 3:
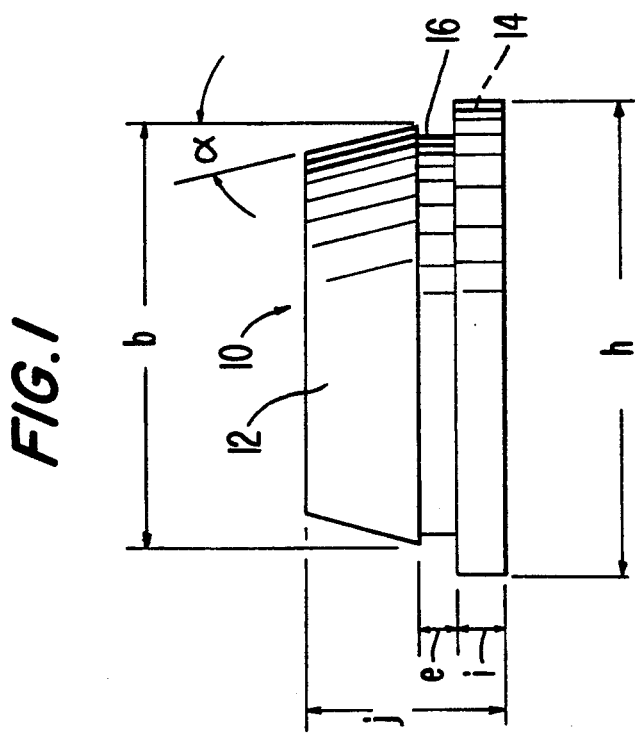
FIG. 3 is an enlarged cross-section of a fragment of the tube closure of FIG. 2.
Figure 6:
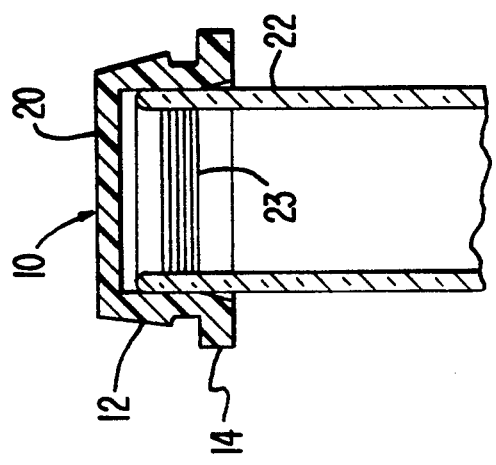
FIG. 6 is a cross-section of the tube closure of FIG. 1 in an inverted position sealing the open end of a smaller tube.

The closure 10 can also be inverted and pushed over the top of a smaller diameter tube 22 such that an inner surface of the side wall 18 extends around and down along an outer surface of the tube, as can be seen from FIG. 6. One tube which the closure 10 is intended to seal in the inverted orientation is a blood serum filter designed to be used with a "16 mm" tube. The blood serum filter includes a tube which fits concentrically within a test tube, such as a "16 mm" test tube. The blood serum filter tubes used with "16 mm" test tubes have outer diameters which range from 0.413"–0.425". The closure 10 is not intended to provide as high a seal integrity against the outer surface of a tube as it does against the inner surface of the "16 mm" tubes. The seal against tube outer surfaces is primarily intended to prevent evaporation. In order to hold the closure 10 on the tube in this orientation, a plurality of radially inwardly projecting beads 23 or ribs is provided on the inner surface of the side wall 18 at the level of the intermediate portion 16, as can be seen in FIGS. 2 and 3. The intermediate portion 16 has a thickness 'c', including the radial thickness of one of the beads 23, of from 0.070" to 0.074". Each bead 23 has a radial thickness 'd' of 0.010", which provides the closure 10 with the internal diameter which best seals with the outer diameter of the blood serum filter tubes for "16 mm" tubes. The closure 10 also includes a flaring surface 24 on the side wall 18 at the level of the flange 14 to assist in guiding and centering the closure 10 over the end of the tube.

The intermediate portion 16 has an axial height 'e' of 0.055"–0.060" (FIG. 1). A cylindrical surface 25 having an axial height 'f' of 0.030"–0.035" extends on the inner surface of the side wall 18 from the point of the thinnest diameter 'a' toward the open end of the closure 10. Three of the beads 23 are provided, each having an axial dimension 'g' of 0.015", with spacing between adjacent beads being 0.015".

The outer diameter 'h' of the flange 14 is 0.675"±0.005". The outwardly extending flange 14 has a thickness 'i' of 0.075"–0.080" and extends 0.053"–0.060" radially beyond the outer surface of the intermediate portion 16. Flange thicknesses less than 0.075" fold over on themselves when pushed by a thumb and do not transmit the thumb forces to the frustoconical plug portion 12. Flange thicknesses greater than 0.080" are unnecessary. The closure 10 has an overall axial dimension 'j' of 0.300"–0.310". The flaring surface 24 at the open end of the closure 10 has a maximum diameter 'k' of 0.482"–0.486" and a minimum diameter 'l' of 0.418"–0.422", with an axial dimension 'm' of 0.67"–0.073".

Figure 4:
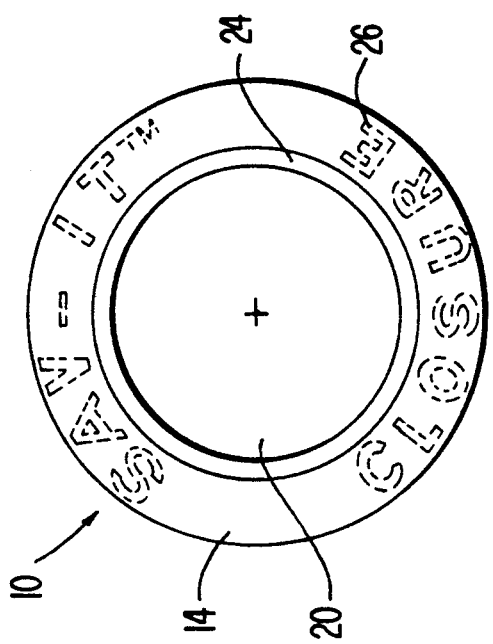
FIG. 4 is a bottom plan view of the tube closure of FIG. 1.

As can be seen from FIG. 4, raised lettering 26 can be provided on the surface of the flange 14 facing the open end of the closure 10, such as by molding the letters during the molding of the closure. Typically the lettering 26 has a height of 0.10".

The closure 10 for "16 mm" tubes fits the following tubes which have internal diameters ranging from 0.500" to 0.574": evacuated blood drawing tubes for serum/gel, plasma, and whole blood; glass test tubes of borosilicate or flint glass; plastic test tubes of polystyrene or polypropylene; round bottom centrifuge tubes of glass, polypropylene, polycarbonate, polyallomer, and polysulfone, blood serum filters, screening columns, sample tubes, and transport mailing tubes. On the blood serum filters, the closure is inverted and the ribs on the internal surface of the closure engage the outer surface of the tube of the blood serum filter, which is designed to fit inside and work with a "16 mm" tube.

As can be seen from FIGS. 7–9, a second embodiment of tube closure according to the present invention, which is designated generally by the reference numeral 30, has a ratio of axial height to diameter which is somewhat greater than the corresponding ratio for the embodiment of FIGS. 1–3. In accordance with the second embodiment, one size of the closure 30 is especially well suited for forming a seal with the inner surfaces of "12 mm" and "13 mm" tubes, which have actual inner diameters ranging from 0.392" for the smallest of the "12 mm" tubes to 0.453" for the largest of the "13 mm" tubes. As with the first embodiment, the alternate embodiment has a frustoconical plug portion 32, a side wall 34, a radially extending rim or flange 36, and an intermediate portion 38 connecting the plug portion 32 to the flange 36. As with the first embodiment, the closure 30 of the alternate embodiment is generally cylindrical in shape and is hollow. The frustoconical plug portion 32 terminates in a transverse end wall 40 defining a self-closing septum for the insertion of a needle, or the like. The closure 30 of the alternate embodiment is made of the same material as the closure 10 of the first embodiment. Raised lettering can be provided on the flange 36.

The side wall 34 has, for fitting "12 mm" and "13 mm" tubes, a thickness 'a' of 0.035" to 0.039" at its thinnest point. Side walls thicker than 0.039" at the thinnest point fit too tightly and result in closures too difficult to remove with one hand. In addition, side walls having thicknesses greater than 0.039" at their thinnest point cause tube breakage problems for smaller diameter glass tubes within the range of a nominal tube size. Wall thicknesses less than 0.039" result in side walls which are too weak and, as a result, bulge out and collapse when the closure is inserted into smaller diameter tubes of a nominal tube size.

The angle 'o' of taper of the plug portion 32 is 15°. Taper angles less than 15 provide insufficient lead-in and are too difficult to insert into the smaller size tubes in the nominal range. Taper angles greater than 15° too greatly reduce the amount of the plug portion in contact with the inner surface of larger tubes for the nominal size and thereby cause inadequate seal integrity.

The outwardly extending flange 36 has a thickness 'i' between. 0.067" and 0.073". Flange thicknesses below 0.067" fold over on themselves when pushed by a thumb and do not transmit the thumb forces to the plug portion. Flange thicknesses greater than 0.073" are unnecessary.

The point of minimum thickness of the side wall 34 extends along the frustoconical plug portion 32 for an axial distance 'n' of 0.070"±0.005", from the junction of the side wall 34 with the end wall 40 to a region of the side wall 34 having a greater wall thickness, which defines a cylindrical inner surface 42 in the closure 30. The cylindrical inner surface 42 has a diameter 'o' of 0.335"±0.002", and a bead 44 extends circumferentially from the inner surface 42 adjacent to the open end of the closure 30 to engage outer surfaces of tubes. The bead 44 has a radius of 0.028", but extends radially only a distance 'd' of 0.01" inside the cylindrical inner surface 42. The intermediate portion 38 has an axial dimension 'e' of 0.050"±0.002" and a thickness 'p' of 0.063"±0.002". The flange 36 has an outer diameter 'h' of 0.575"±0.005", and projects radially 0.052"-0.061" beyond the intermediate portion 38.

The closure 30 for "12 mm" and "13 mm" tubes engages, with the outer tapered surface of its frustoconical plug portion 32, the inner surface of the following tubes: "13 mm" evacuated blood drawing tubes for serum/gel, plasma, and whole blood; "12 mm" and "13 mm" glass test tubes; "12 mm" and "13 mm" plastic test tubes of polystyrene and polypropylene; "12 mm" round bottom centrifuge tubes of polystyrene and "13 mm" round bottom centrifuge tubes of polypropylene, polycarbonate, and polyallomer; "13 mm" conical centrifuge tubes of glass. The same closure engages, with its outer tapered surface, the inner surface of blood serum filters designed to be used in "16 mm" tubes. When the closure 30 is inverted, it fits blood serum filters designed to be used with "13 mm" tubes like a cap, that is, with the inner surface 42 of the closure 30 engaging the outer surface of the blood serum filter tube. Blood serum filter tubes used with "13 mm" tubes have outer diameters ranging from 0.327"-0.344".

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

We claim:

1. A tube closure comprising a hollow member having a closed end, an open end and a side wall extending between said open end and said closed end, said side wall defining a junction with said closed end, said side wall having a tapering portion defining a frustoconical outer surface for engaging an inner surface of a tube, said frustoconical outer surface tapering toward said closed end, said side wall having an inner surface for engaging an outer surface of a tube, said closed end defining a septum, said side wall having a minimum thickness at said junction with said closed end, said tube closure being made of an elastomeric material having a Shore A hardness of 70-80, a tensile strength of 1,000-1,300 psi, and an elongation to break of 650%-750%.

2. The tube closure of claim 1, further comprising a flange extending radially outward from said side wall at said open end of said closure.

3. The tube closure of claim 2, wherein said side wall has an intermediate portion between said tapering portion and said flange, said tapering portion having a maximum diameter, and said intermediate portion having an outer diameter smaller than the maximum diameter of said frustoconical outer surface.

4. The tube closure of claim 1, wherein said hollow member has an axis of symmetry, and said frustoconical outer surface defines an angle of 15° with the axis of symmetry.

5. The tube closure of claim 1, wherein a bead projects radially inward from said inner surface of said side wall.

6. The tube closure of claim 5, wherein a plurality of said beads project radially inward from said inner surface of said side wall.

7. The tube closure of claim 1, wherein said inner surface of said side wall comprises means for sealing against an outer surface of tubes having an outer diameter of 0.327"-0.344".

8. The tube closure of claim 6, wherein said beads comprise means for sealing against an outer surface of tubes having an outer diameter of 0.413"-0.425".

9. The tube closure of claim 1, wherein said tapering portion comprises means for sealing against an inner surface of a tube having an inner diameter of 0.500"-0.574".

10. The tube closure of claim 1, wherein said tapering portion comprises means for sealing against an inner surface of a tube having an inner diameter of 0.392"-0.453".

11. The tube closure of claim 9, wherein said tapering portion has a maximum diameter of 0.600"–0.604" and said minimum thickness of said side wall is 0.040"–0.044".

12. The tube closure of claim 10, wherein tapering portion has a maximum diameter of 0.473"–0.477" and said minimum thickness of said side wall is 0.035"–0.039".

13. The tube closure of claim 11, wherein said hollow member has an axis of symmetry, and said flange has a thickness, parallel to said axis of symmetry, of 0.075–0.080".

14. The tube closure of claim 12, wherein said hollow member has an axis of symmetry, and said flange has a thickness, parallel to said axis of symmetry, of 0.067"–0.073".

15. In combination, a first tube having an inner surface and an outer surface; and a tube closure comprising a hollow member having a closed end, an open end and a side wall extending between said open end and said closed end, said side wall defining a junction with said closed end, said side wall having a tapering portion defining a frustoconical outer surface engaging said inner surface of the tube, said frustoconical outer surface tapering toward said closed end, said side wall having an inner surface for engaging an outer surface of another tube, said closed end defining a septum, said side wall having a minimum thickness at said junction with said closed end, said tube closure being made of an elastomeric material having a Shore A hardness of 70–80, a tensile strength of 1,000–1,300 psi, and an elongation to break of 650%–750%.

16. The, combination of claim 15, further comprising a flange extending radially outward from said side wall at said open end of said closure, said flange extending radially beyond the outer surface of said first tube.

17. The combination of claim 16, wherein the hollow member has an axis of symmetry, and said flange has a thickness, parallel to said axis of symmetry, of 0.075"–0.80" and a radial projection of 0.053"–0.060" beyond said intermediate portion of said side wall of said hollow member.

18. The combination of claim 16, wherein the hollow member has an axis of symmetry, and said flange has a thickness, parallel to said axis of symmetry, of 0.067"–0.073" and a radial projection of 0.052"–0.061" beyond said intermediate portion of said side wall of said hollow member.

19. The combination of claim 15, wherein said tapering portion has a maximum diameter of 0.600"–0.604", said minimum thickness of said side wall is 0.040"–0.044", and said first tube has an inner surface having an inner diameter of 0.500"–0.574".

20. The combination of claim 15, wherein said tapering portion has a maximum diameter of 0.473"–0.477", said minimum thickness of said side wall is 0.035"–0.039", and said first tube has an inner surface having an inner diameter of 0.392"–0.453".

21. The combination of claim 15, wherein said tube is a glass tube.

* * * * *

UNITED STATES PATENT AND TRADEMARK OFFICE
CERTIFICATE OF CORRECTION

PATENT NO. : 5,224,515
DATED : July 6, 1993
INVENTOR(S) : Kevin D. Foster

It is certified that error appears in the above-identified patent and that said Letters Patent is hereby corrected as shown below:

Column 1, Line 66, --, 0.035"-- should be inserted after "tubes";

Column 5, Line 18, "'a'" should be -- 'a''--;

Line 29, "'o'" should be -- 'a''--;

Line 30, "15" should be -- 15°--;

Line 36, "'i'" should be -- 'i'' --;

Line 53, "'d'" should be -- 'd'' --;

Line 55, "'e'" should be -- 'e'';

Claim 16, Line 1, after "The", the comma should be deleted.

Signed and Sealed this

Nineteenth Day of April, 1994

Attest:

BRUCE LEHMAN

Attesting Officer

Commissioner of Patents and Trademarks